United States Patent
Tang

(10) Patent No.: US 10,402,317 B2
(45) Date of Patent: Sep. 3, 2019

(54) DATA STORAGE DEVICE AND FLASH MEMORY CONTROL METHOD

(71) Applicant: Silicon Motion, Inc., Jhubei, Hsinchu County (TW)

(72) Inventor: Tao-En Tang, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/716,587

(22) Filed: Sep. 27, 2017

(65) Prior Publication Data

US 2018/0196747 A1     Jul. 12, 2018

(30) Foreign Application Priority Data

Jan. 6, 2017    (TW) ............... 106100399 A

(51) Int. Cl.
*G06F 12/02*     (2006.01)
*G06F 12/06*     (2006.01)

(52) U.S. Cl.
CPC ........ *G06F 12/063* (2013.01); *G06F 12/0246* (2013.01); *G06F 2212/1024* (2013.01); *G06F 2212/1041* (2013.01); *G06F 2212/2022* (2013.01); *G06F 2212/7201* (2013.01); *G06F 2212/7202* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 2006/0149893 A1 | 7/2006 | Barfuss et al. | |
| 2007/0300037 A1* | 12/2007 | Rogers | G06F 12/0292 711/202 |
| 2011/0080784 A1 | 4/2011 | Chang et al. | |
| 2012/0054419 A1* | 3/2012 | Chen | G06F 11/1441 711/103 |
| 2014/0068383 A1* | 3/2014 | Cheng | G06F 12/00 714/773 |

FOREIGN PATENT DOCUMENTS

| | | |
|---|---|---|
| TW | 201432449 A | 8/2014 |
| TW | 201617876 A | 5/2016 |

* cited by examiner

*Primary Examiner* — Edward J Dudek, Jr.
(74) *Attorney, Agent, or Firm* — McClure, Qualey & Rodack, LLP

(57) ABSTRACT

A mapping information rebuilding technique for a flash memory is introduced. Mapping information of data that has been stored in the flash memory is recorded in a plurality of logically-grouped tables. System information blocks are provided to store the mapping information by using the logically-grouped table as a management unit. A grouping list is stored in at least one pre-defined physical address of each system information block to list logical group numbers of the logically-grouped tables stored in the physical pages of the corresponding system information blocks. In each system information block, more physical pages are used in storing the logically-grouped tables than are used in storing the grouping list.

13 Claims, 7 Drawing Sheets

FIG. 4B

| G# | B# | U# |
|---|---|---|
| 1 | | |
| 2 | | |
| .... | .... | .... |
| 131,071 | | |

DATA STORAGE DEVICE AND FLASH MEMORY CONTROL METHOD

CROSS REFERENCE TO RELATED APPLICATIONS

This Application claims priority of Taiwan Patent Application No. 106100399, filed on Jan. 6, 2017, the entirety of which is incorporated by reference herein.

BACKGROUND OF THE INVENTION

Field of the Invention

The present invention relates to data storage devices and in particularly relates to flash memory control methods.

Description of the Related Art

Today's data storage devices generally use a flash memory as a storage medium. A flash memory is commonly used in memory cards, USB flash devices, solid-state drives, and so on. In another application with multi-chip package technology, a flash memory and a controller are combined in one package as an embedded multi-media card (e.g. eMMC).

The storage space of a flash memory is generally divided into a plurality of physical blocks. Each physical block includes a plurality of physical pages. When updating data within the flash memory, the new data is not overwritten on the same storage space. Instead, the new data is stored in a spare space. The spare space may be provided by the same physical block that stores the old data. Or, the spare space may be provided by another physical block that is different from the one storing the old data. After the data is updated, the old data is regarded as invalid. A physical block that contains a lot of invalid data should be cleaned by a garbage collection mechanism. By copying valid data to another space, only invalid data remains. The physical block only containing invalid data can be released by an erase operation. Specifically, to release and reuse a physical block, the required erase operation is performed on the whole physical block. The management of the storage space of flash memory, therefore, is obviously more complex than other types of storage mediums. The maintenance of the mapping information between logical addresses and physical addresses is also an important topic in flash memory control.

BRIEF SUMMARY OF THE INVENTION

A data storage device in accordance with an exemplary embodiment of the disclosure includes a flash memory and a microcontroller. The flash memory comprises a plurality of physical blocks with each physical block comprising a plurality of physical pages. The microcontroller allocates the physical blocks to provide system information blocks (Table#1, Table#2 . . . Table#N). Mapping information of data that has been stored in the flash memory is recorded by a plurality of logically-grouped tables (H2F_G), the logically-grouped tables (H2F_G) combined together according to logical address form a mapping table (H2F). The microcontroller further stores the logically-grouped tables (H2F_G) to physical pages of the system information blocks (Table#1, Table#2 . . . Table#N). The microcontroller further records a grouping list in at least one pre-defined physical address of each system information block (ex: F2G#1 to F2G#N are stored in Table#1 to Table#N) to list logical group numbers of the logically-grouped tables (H2F_G) stored in the physical pages of the corresponding system information block. In each system information block (Table#1, Table#2 . . . or Table#N), more physical pages are used in storing the logically-grouped tables (H2F) than are used in storing the grouping list (F2G#1, F2G#2 . . . or F2G#N).

A flash memory control method is also discussed in accordance with an exemplary embodiment of the disclosure to control a flash memory that includes a plurality of physical blocks with each physical block comprising a plurality of physical pages. The control method includes the following steps: allocating the physical blocks to provide system information blocks, recording mapping information of data that has been stored in the flash memory by a plurality of logically-grouped tables, wherein the logically-grouped tables combined together according to logical address form a mapping table; storing the logically-grouped tables to physical pages of the system information blocks; and recording a grouping list in at least one pre-defined physical address of each system information block to list logical group numbers of the logically-grouped tables stored in the physical pages of the corresponding system information block. In each system information block, more physical pages are used in storing the logically-grouped tables than are used in storing the grouping list.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4B shows what is recorded in the grouping list F2G#j of the system information block Table#j of FIG. 4A in accordance with an exemplary embodiment of the disclosure;

FIG. 5 depicts the architecture of the group-to-flash mapping table G2F; and

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
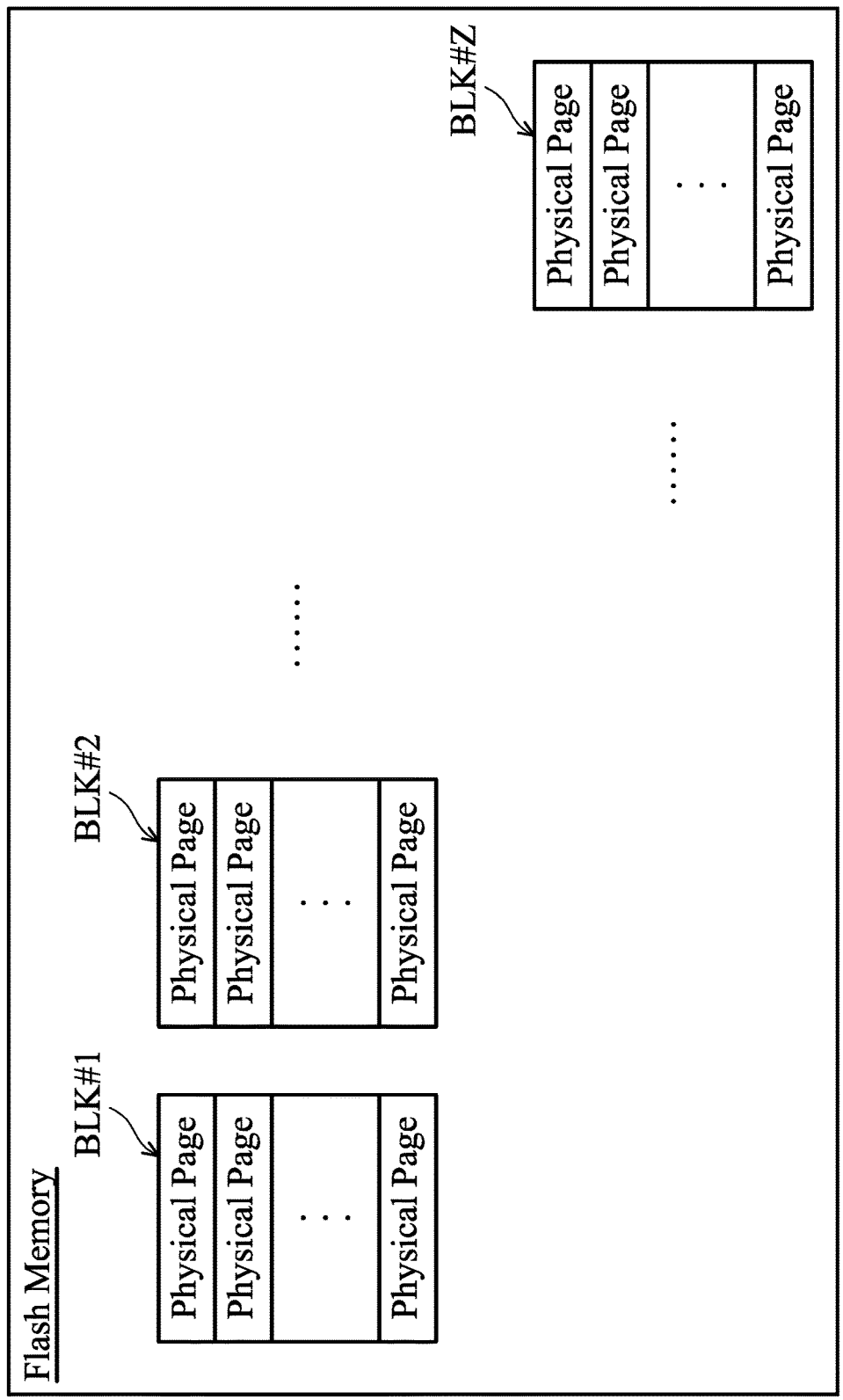
FIG. 1 depicts the memory space allocation of a non-volatile memory.

FIG. 1 depicts the memory space allocation of a non-volatile memory. The non-volatile memory is divided into a plurality of physical blocks BLK#1, BLK#2 . . . BLK#Z, where Z is an integer. Each physical block includes a plurality of physical pages. In an example, one physical block includes 256 physical pages. Each physical page can be allocated to store data of a pre-defined length, ex: 16 KB. The physical blocks are further categorized into in-use blocks containing valid data and spare blocks containing no valid data. The in-use blocks are further categorized into different types and detailed in the following paragraphs.

The non-volatile memory may be a flash memory, a magnetoresistance RAM, a ferroelectric RAM, a resistive RAM and so on, which is a memory device for long-term storage of data. The following discussion focuses on flash memory techniques but is not intended to limit the scope of the invention.

Figure 2:
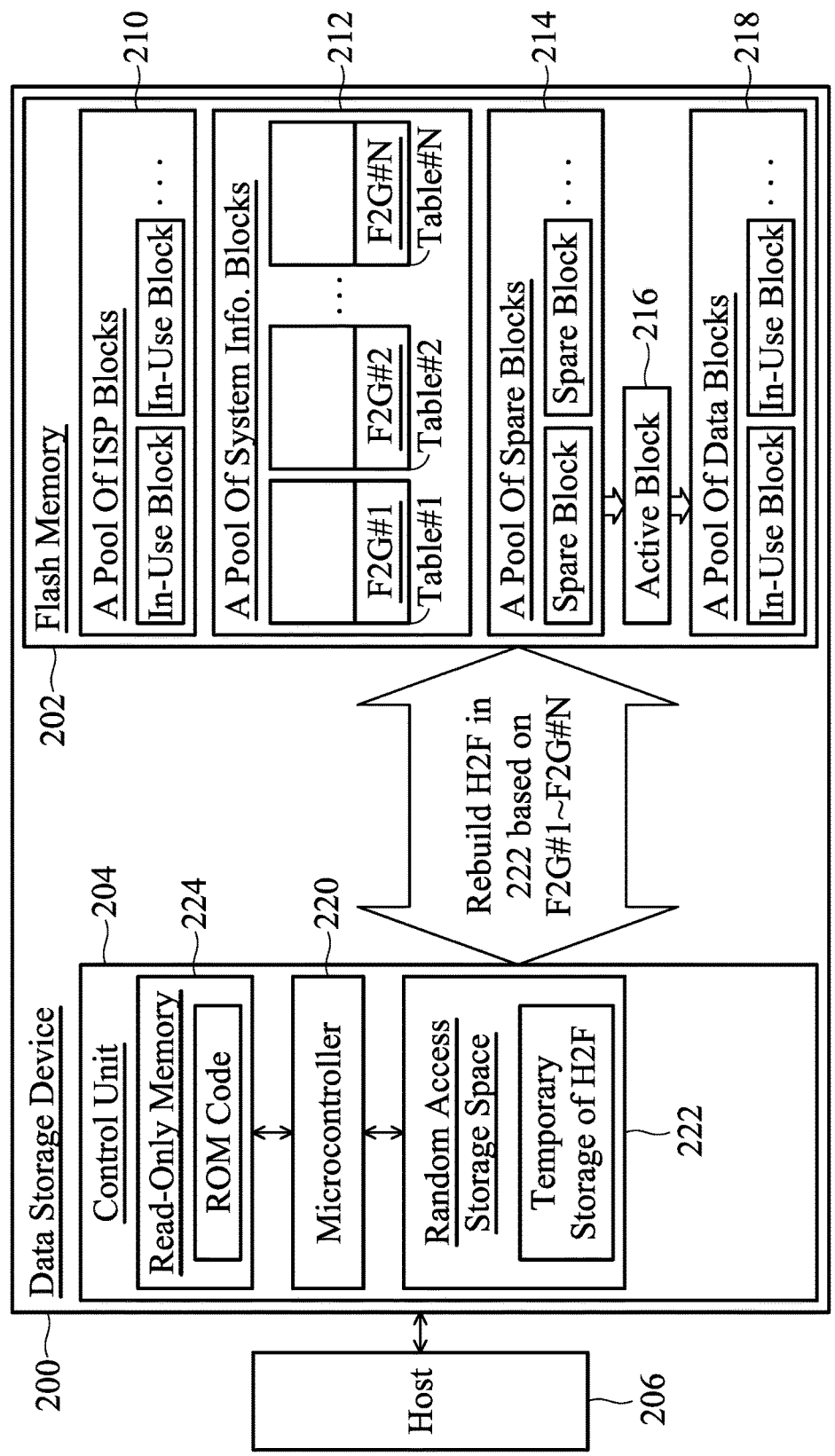
FIG. 2 depicts a data storage device 200 in accordance with an exemplary embodiment of the disclosure, which includes a flash memory 202 and a control unit 204.

FIG. 2 depicts a data storage device 200 in accordance with an exemplary embodiment of the disclosure, which includes a flash memory 202 and a control unit 204. The control unit 204 is coupled between a host 206 and the flash memory 202 to operate the flash memory 202 in accordance with the instructions issued from the host 206.

The flash memory is preferably allocated to include a pool 210 of in-system programming blocks, a pool 212 of system information blocks, a pool 214 of spare blocks, an active block 216 and a pool 218 of data blocks. The pool 210 of in-system programming blocks, the pool 212 of system information blocks and the pool 218 of data blocks each preferably include a plurality of in-use blocks or include just one in-use block. The pool 214 of spare blocks preferably includes a plurality of spare blocks.

The pool of in-system programming blocks 210 stores in-system programming (ISP) code. The logical-to-physical mapping information of the data stored in flash memory 202 is preferably recorded by a host logical to flash physical address table (or named a mapping table) abbreviated as H2F. In this disclosure, the mapping table H2F is maintained in the flash memory 202 in a special form. The Mapping table H2F can be rebuilt by reading the physical blocks Table#1, Table#2 . . . Table#N of the pool 212 of system information blocks. In the following discussion, the physical blocks Table#1, Table#2 . . . Table#N are called system information blocks. The active block 216 is chosen from the pool 214 of spare blocks for receiving data issued from the host 206 and, after the reception of data, the active block 216 is pushed into the pool 218 of data blocks.

The control unit 204 includes a microcontroller 220, a random access storage space 222 and a read-only memory 224. The random access storage space 222 may include an internal random access memory such as a DRAM or an SRAM and so on and is located within the same die as the microcontroller 220. The random access storage space 222 may further include an external random access memory which is not located within the same die as the microcontroller 220. The read-only memory 224 stores read-only code, like ROM code. The microcontroller 220 operates by executing the read-only code provided by the read-only memory 224 and/or the in-system programming code retrieved from the pool 210 of the in-system programming blocks of the flash memory 202. The mapping table H2F may be wholly or partially loaded into the internal or external random access memory of the random access storage space 222 for temporary storage. Thus, the use status of the flash memory 202 is dynamically recorded and managed.

The mapping table H2F with a considerable size is divided into logically-grouped tables H2F_G according to logical address (or logical block address, abbreviated as LBA). The logically-grouped tables H2F_G may be identified by a logical group number i and the corresponding logically-grouped table is H2F_G#i. When data is written into the flash memory 202, the logically-grouped tables H2F_G are established according to the logical address or the LBA of the write data and stored into the flash memory 202 by the system information blocks Table#1, Table#2 . . . Table#N. Each logically-grouped table H2F_G is 2 KB (not intended to be limited thereto). The system information blocks Table#1, Table#2 . . . Table#N each may contain a plurality of logically-grouped-tables H2F_G. The following discussion focuses on the LBA examples and it is not intended to limit the disclosure thereto.

To quickly combine the logically-grouped tables H2F_G scattered in the system information blocks Table#1, Table#2 . . . Table#N to form the mapping table H2F, grouping lists F2G#0, F2G#1 . . . F2G#N are further introduced in the disclosure to be written into the system information blocks Table#1, Table#2 . . . Table#N to show how the physical space of the corresponding system information block (Table#1, Table#2, . . . or Table#N) stores the logically-grouped tables H2F_G. The grouping lists F2G#0, F2G#1 . . . F2G#N each is centralized in a pre-defined space of the corresponding system information blocks Table#1, Table#2 . . . Table#N. For example, the pre-defined space may be at the end of the corresponding system information block that is filled when closing the corresponding system information block. In other exemplary embodiments, the pre-defined space may be another location. Note that in any of the system information blocks Table#1, Table#2 . . . Table#N, more physical pages are used in storing the logically-grouped tables H2F_G than are used in storing the corresponding grouping list (F2G#0, F2G#1 . . . or F2G#N). When rebuilding the mapping table H2F, the grouping lists F2G#0, F2G#1 . . . F2G#N are read from the system information blocks Table#1, Table#2 . . . Table#N in the pool 212 and thereby how the system information blocks Table#1, Table#2 . . . Table#N store the logically-grouped tables H2F_G is obtained. The grouping lists F2G#0, F2G#1 . . . F2G#N are combined together and, according to the combined grouping lists F2G#0, F2G#1 . . . F2G#N, the valid logically-grouped tables H2F_G within the system information blocks Table#1, Table#2 . . . Table#N are known. Only the valid logically-grouped tables H2F_G are read to rebuild the mapping table H2F, which significantly shortens the time required to rebuild the mapping table H2F.

In an exemplary embodiment, a pre-defined signature or serial number is written into the system information blocks Table#1, Table#2 . . . Table#N to mark that mapping information is stored in the system information blocks Table#1, Table#2 . . . Table#N. When being powered on, the data storage device 200 recognizes the system information blocks Table#1, Table#2 . . . Table#N from numerous physical blocks of the flash memory 202 based on the pre-defined signature or serial number. The system information blocks Table#1, Table#2 . . . Table#N may further store time information such as a serial number or a time stamp, to sort the system information blocks Table#1, Table#2 . . . Table#N from old to new.

Figure 3:
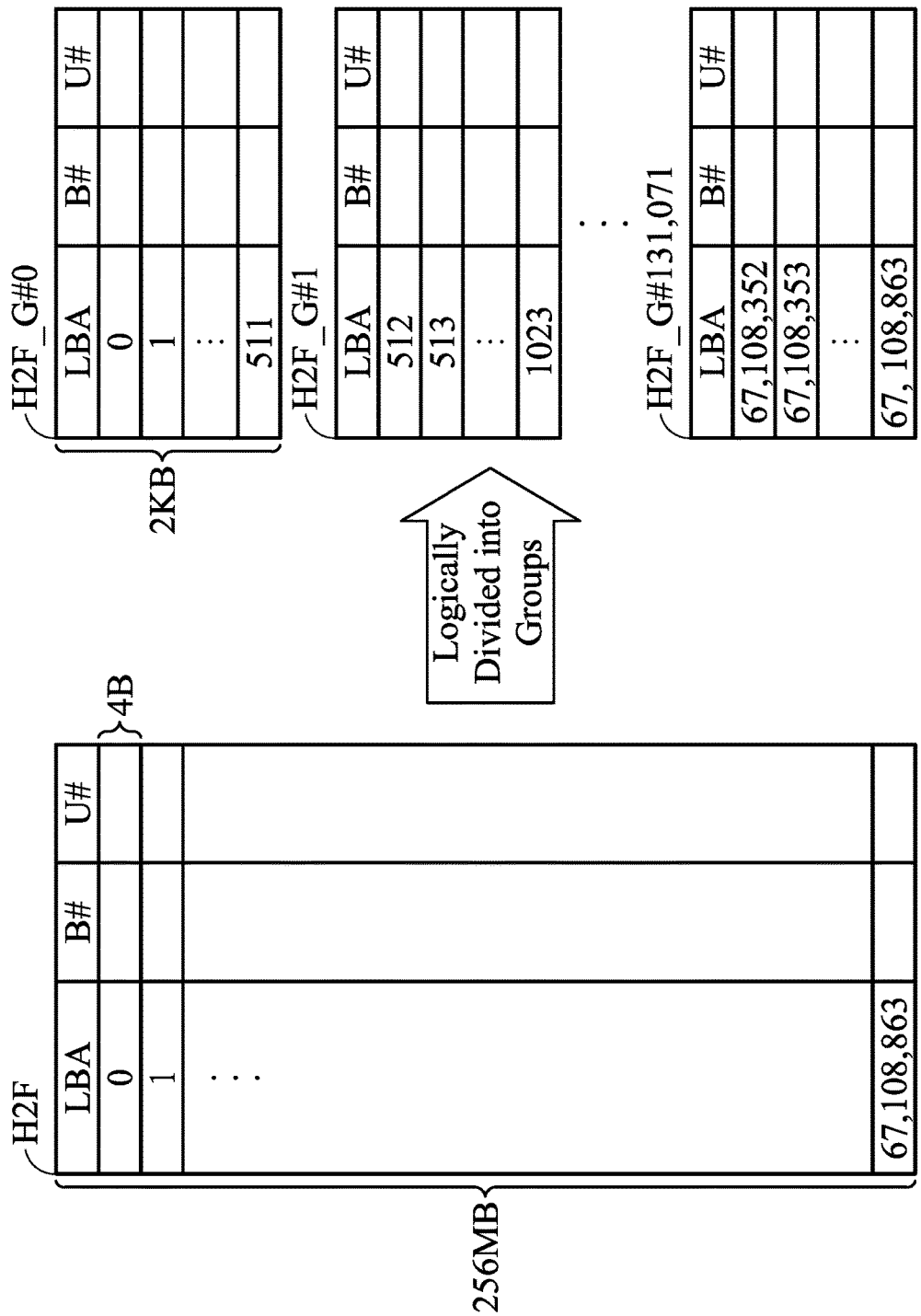
FIG. 3 shows how to divide a mapping table H2F into logically-grouped tables H2F_G.

FIG. 3 shows how to divide the mapping table H2F into the logically-grouped tables H2F_G. The mapping table H2F is preferably searched by using the logical block address (LBA) as the index, which is not intended to be limited thereto. The size of the mapping table H2F may be 256 MB and may be grouped (or divided) into 131,072 logically-grouped tables H2F_G#0, H2F_G#1 . . . H2F_G#131,071 each being 2 KB long. In the exemplary embodiment shown in FIG. 3, 4 KB of data corresponds to 4 B mapping information. A block number B# and a unit number U# are shown in the mapping information. A physical page of 16 KB is divided into 4 units numbered from U#0 to U#3. Each pair of bit number and unit number corresponds to one 4 KB unit. In another exemplary embodiment wherein each physical page provides only 4 KB for user's data storage, one physical page is the same size as one management unit of mapping information. Thus, the mapping information shows the physical number rather than the unit number. For a storage space of 256 GB, the mapping information containing 67,108,864 (256 GB/4 KB) data for LBA#0 to LBA#67,108,863 is 256 MB (256 GB×4 B/4 KB) long. The mapping table H2F may be divided into groups according to a pre-defined size. As shown, each group is 2 KB long. A mapping table H2F may be divided into 131,072 (256 MB/2 KB) logically-grouped tables H2F G#0 to H2F G#131,071. Each logically-grouped table H2F_G contains 512 data. It means that there are 131,072 logical groups G#0, G#1 . . . G#131,071. Instead of maintaining the whole mapping table H2F together, according to the concept that divides the mapping information logically, the control unit 204 maintains the mapping information by using the logically-grouped table H2F_G as a unit. In this manner, the mapping table H2F is updated efficiently. It is not necessary to erase a large amount of physical blocks when maintaining the mapping table H2F to follow the write operations.

Figure 4A:
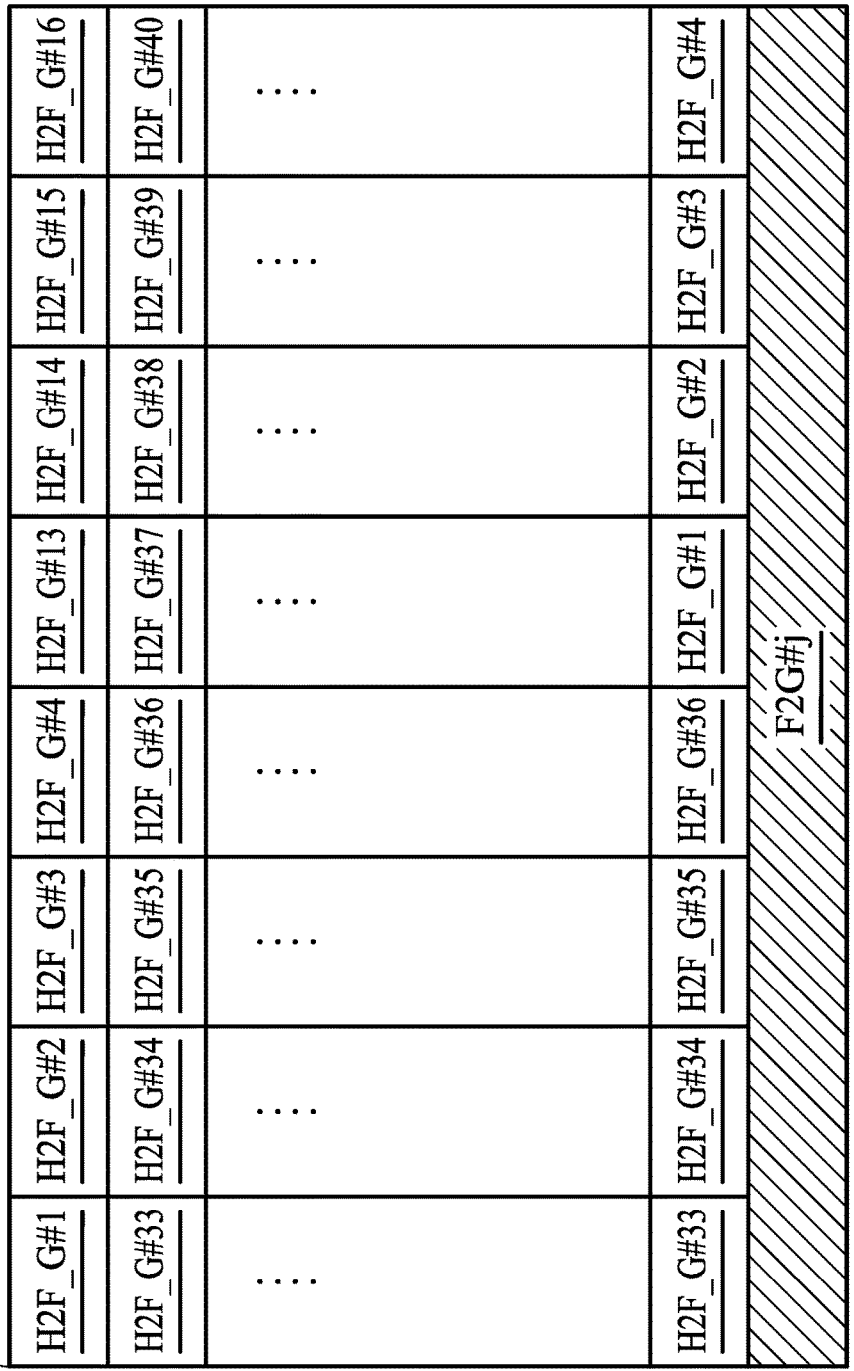
FIG. 4A depicts an architecture of the system information blocks Table#1 to Table#N in accordance with an exemplary embodiment of the disclosure.

FIG. 4A depicts an architecture of the system information blocks Table#1 to Table#N in accordance with an exemplary embodiment of the disclosure. For simplicity, the discussion focuses on the system information block Table#j, where j is a number. The system information block Table#j contains 256 physical pages. Each physical page contains 16 KB and stores 8 logically-grouped tables H2F_G. Thus, there are 2040 (8×255) logically-grouped tables H2F_G in the system information block Table#j and a grouping list F2G#j is generated and written into the final physical page (page number 255) of the system information block Table#j. The control unit 204 records the logically-grouped tables H2F_G in the system information block Table#j according to the write operations performed on the flash memory 202. The grouping list F2G#j is a list of logical group numbers that shows the order in which the logically-grouped tables H2F_G are filled into the system information block Table#j.

Figure 4B:
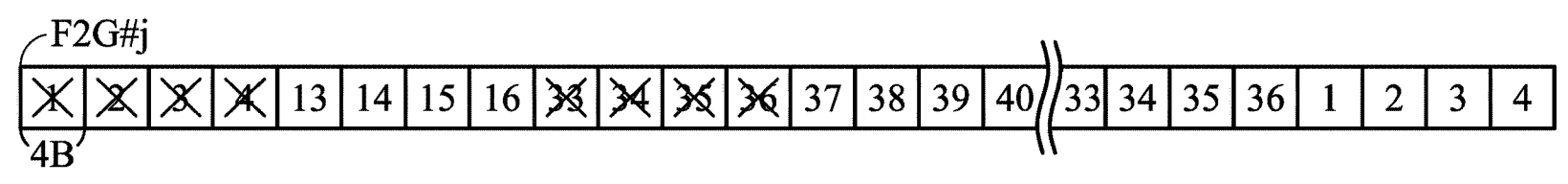

FIG. 4B shows what is recorded in the grouping list F2G#j of the system information block Table#j of FIG. 4A in accordance with an exemplary embodiment of the disclosure. A series of logical group numbers is shown, sequentially corresponding to the logical group numbers of the logically-grouped tables H2F_G recorded in the system information block Table#j. Each logical group number requires 4 bytes to record. When the system information block Table#j has 256 physical pages, the grouping list F2G#j (255×8×4 B) requires less than 8 KB, smaller than the size of one single physical page (16 KB). Thus, it is workable to use one physical page of the system information block Table#j to record the grouping list F2G#j. For example, the grouping list F2G#j may be recorded in the last physical page of the system information block Table#j or in other pre-defined physical pages in the system information block Table#j. In other exemplary embodiments, the system information block Table#j may be divided into two parts. The first part may include physical pages numbered from 0 to 127. The second part may include physical pages numbered from 128 to 255. The logical group numbers of the logically-grouped tables H2F_G stored in the physical pages 0 to 126 in the first part are listed in the last physical page, numbered 127, of the first part. The logical group numbers of the logically-grouped tables H2F_G stored in the physical pages 128 to 255 in the second part are listed in the last physical page, numbered 255, of the second part.

The control unit 204 reads the last physical page (or the pre-defined physical page) of the system information blocks Table#1 to Table#N sequentially to obtain the N grouping lists F2G#1 to F2G#N. After combing and organizing the logical group numbers listed in the grouping lists F2G#1 to F2G#N, a long sequence of logical group numbers is obtained and thereby the physical address of the latest version of every logically-grouped table H2F_G is obtained. Thus, the control unit 204 reads the obtained physical addresses to build the whole mapping table H2F on the external random access memory. In some exemplary embodiments, specific logically-grouped tables H2F_G stored in specific physical addresses are specifically read and stored into the internal random access memory for a specific management requirement of data.

To combine and organize the logically-grouped tables H2F_G, the control unit 204 may establish a group-to-flash mapping table G2F which sequentially show the physical addresses of the logically-grouped tables H2F_G in the order of logical group number. In comparison with a grouping list F2G that is searched by using the physical address as the index, the group-to-flash mapping table G2F is searched by using the logical group number as the index. The group-to-flash mapping table G2F inversely relates to the grouping list F2G. The control unit 204 collects the grouping lists F2G#1 to F2G#N recorded in the system information blocks Table#1 to Table#N and reverses the collected information to obtain the group-to-flash mapping table G2F.

Figure 5:
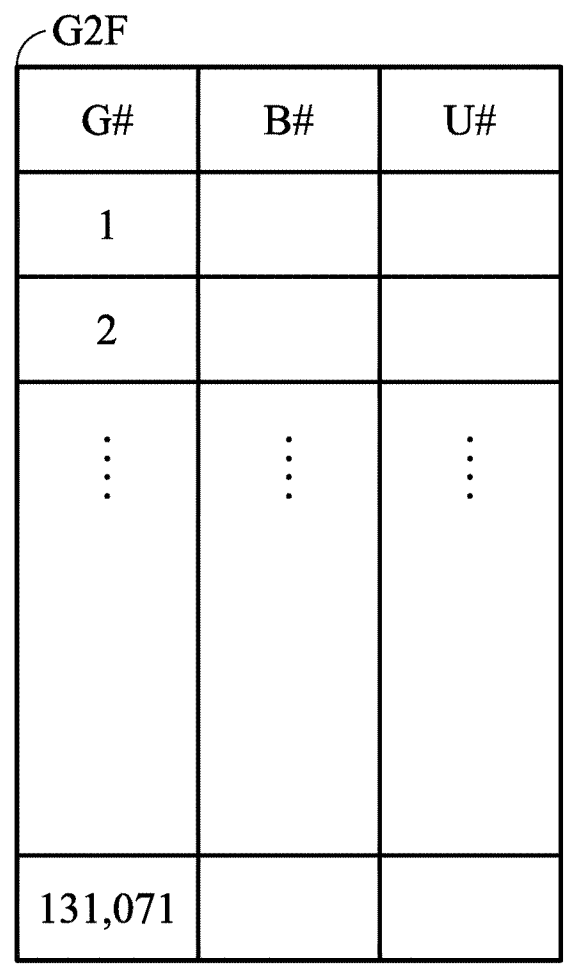

FIG. 5 depicts the architecture of the group-to-flash mapping table G2F, which shows the physical positions (indicated by a block number B# and a unit number U#) of the logically-grouped tables H2F G#0, H2F G#1 . . . H2F G#131,071 in the order of the logical group numbers (from logical group number G#0 to logical group number G#131,071). Accordingly, the control unit 204 reads the logically-grouped tables H2F_G#0, H2F_G#1 . . . H2F G#131,071 from the system information blocks Table#1 to Table#N and rebuilds the mapping table H2F. In some exemplary embodiments, specific logically-grouped tables H2F_G are specifically read according to the group-to-flash mapping table G2F to be stored into the internal random access memory.

Considering the operational characteristics of the flash memory 202, the new (valid) mapping information and the old (invalid) mapping information may coexist in the system information blocks table#1 to Table#N. Thus, the grouping lists F2G#1 to F2G#N are preferably sorted according to time and thereby the invalid mapping information is filtered out. In an exemplary embodiment, the grouping lists F2G#1 to F2G#N are sorted according to the time information (e.g. serial numbers or time stamps) of the system information blocks table#1 to Table#N. After sorting the grouping lists F2G#1 to F2G#N according to time, the control unit 204 reads the grouping lists F2G#1 to F2G#N from the newer grouping list and ignores the older and invalid mapping information. In another exemplary embodiment, the control unit 204 reads the grouping lists F2G#1 to F2G#N from the older grouping list and replaces the older and invalid mapping information by the newer mapping information. Thus, the group-to-flash mapping table G2F is established.

An example of building the group-to-flash mapping table G2F is shown. Referring to the grouping list F2G#j shown in FIG. 4A and FIG. 4B, the newer information is contained at the end. The grouping list F2G#j lists logical group numbers: [1, 2, 3, 4, 13, 14, 15, 16, 33, 34, 35, 36, 37, 38, 39, 40 . . . 33, 34, 35, 36, 1, 2, 3, 4]. The logical group numbers [1, 2, 3, 4] and [33, 34, 35, 36] listed in the former and repeated at the end as [33, 34, 35, 36, 1, 2, 3, 4] are marked by the cross symbols as invalid/old information. When rebuilding the mapping table H2F, the invalid information marked by the cross symbols are ignored and skipped without spending time on scanning the invalid mapping information.

Figure 6:
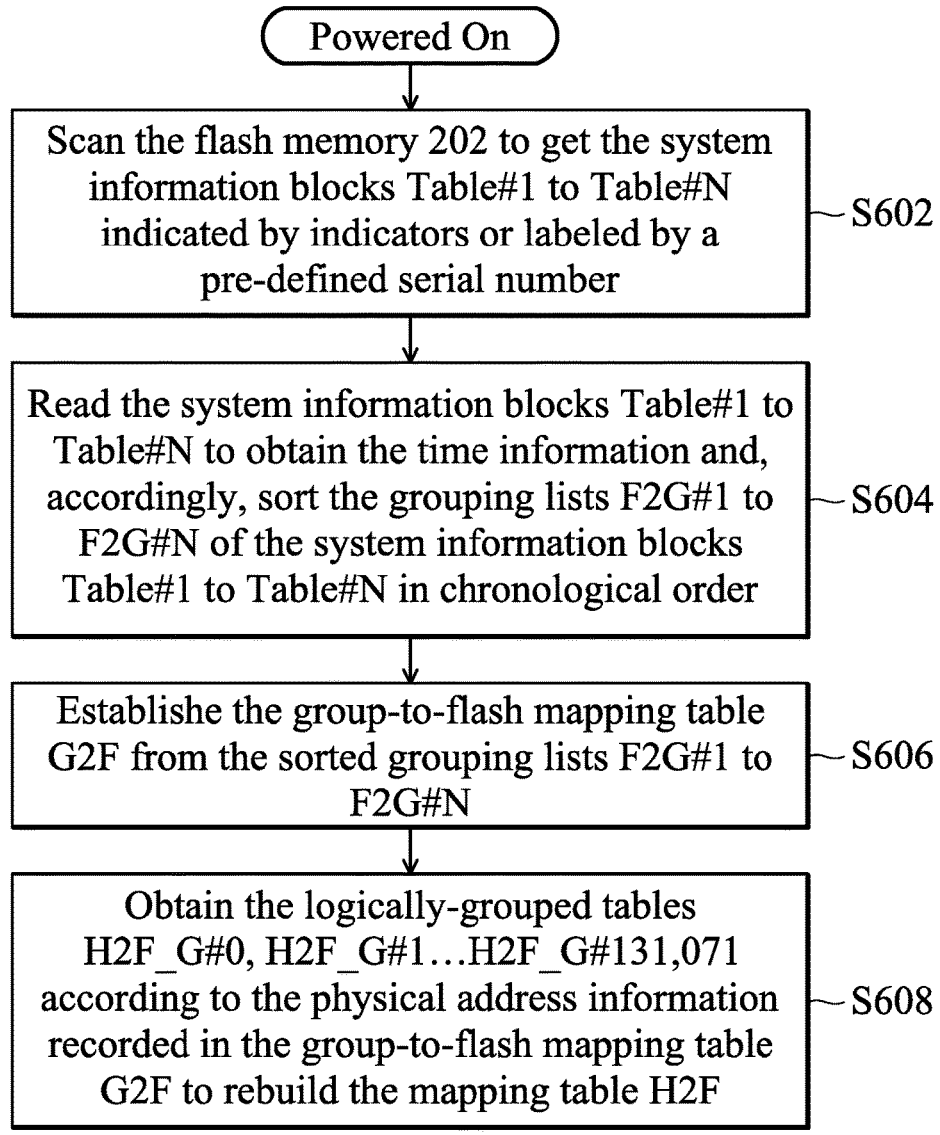
FIG. 6 is a flowchart depicting how to rebuild the mapping table H2F when powering on the data storage device 200.

FIG. 6 is a flowchart depicting how to rebuild the mapping table H2F when powering on the data storage device 200. When power is supplied to the data storage device, step S602 is performed, in which the control unit 204 scans the flash memory 202 to get the system information blocks Table#1 to Table#N indicated by indicators or labeled by a pre-defined serial number. In step S604, the control unit 204 reads the system information blocks Table#1 to Table#N to obtain the time information and, accordingly, sorts the grouping lists F2G#1 to F2G#N of the system information blocks Table#1 to Table#N in chronological order. The grouping lists F2G#1 to F2G#N may be sorted from old to new or from new to old. In step S606, the control unit 204 establishes the group-to-flash mapping table G2F from the sorted grouping lists F2G#1 to F2G#N. In step S608, the control unit 204 obtains the logically-grouped tables H2F_G#0, H2F_G#1 . . . H2F G#131,071 according to the physical address information recorded in the group-to-flash mapping table G2F to rebuild the mapping table H2F. Unlike conventional techniques that scan all physical pages of the system information blocks Table#1 to Table#N, the logically-grouped tables H2F_G#0, H2F_G#1 . . . H2F G#131,071 are quickly obtained in the disclosure based on the grouping lists F2G#1 to F2G#N recorded in the system information blocks Table#1 to Table#N and thereby the mapping table H2F is rebuilt in the external random access memory. The time required to establish the mapping table H2F during the power-on procedure of the data storage device 200 is considerably shortened to achieve the objective of the disclosure.

In some exemplary embodiments which are not equipped with an external random access memory, the control unit 204 may obtain the physical address information of a specific logically-grouped table H2F_G from the group-to-flash mapping table G2F obtained from step S606 and store the specific logically-grouped table H2F_G into an internal random access memory to partially manage the flash memory 202. The time required to access the specific logically-grouped table H2F_G is also effectively reduced to achieve the objective of the disclosure.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, comprising a plurality of physical blocks with each physical block comprising a plurality of physical pages; and
a microcontroller, allocating the physical blocks to provide system information blocks, wherein mapping information of data that has been stored in the flash memory is recorded by a plurality of logically-grouped tables, the logically-grouped tables combined together according to logical address form a mapping table, and the microcontroller further stores the logically-grouped tables to physical pages of the system information blocks;

wherein:
the microcontroller further records a grouping list in at least one pre-defined physical address of each system information block to list logical group numbers of the logically-grouped tables stored in the physical pages of the corresponding system information block;
in each system information block, more physical pages are used in storing the logically-grouped tables than are used in storing the grouping list;
according to the grouping list of each system information block, the microcontroller obtains valid logically-grouped tables without scanning through every page of all system information blocks;
the microcontroller further records time information in the system information blocks to be used in sorting the grouping lists in chronological order;
each grouping list is filled with a series of logical group numbers from old to new; and
the grouping lists are combined and organized to form a long sequence of logical group numbers for obtaining the valid logically-grouped tables.

2. The data storage device as claimed in claim 1, wherein the logical address is a logical block address.

3. The data storage device as claimed in claim 1, wherein:
the logically-grouped table is searched by using the logical block address as an index.

4. The data storage device as claimed in claim 1, wherein:
the microcontroller reads the long sequence of logical group numbers from the end and adopts only logical group numbers that are first read from the long sequence of logical group numbers to form a group-to-flash mapping table that shows where valid logically-grouped tables are stored in the system information blocks.

5. The data storage device as claimed in claim 4, wherein:
the microcontroller obtains the valid logically-grouped tables of all logical group numbers from the system information blocks based on the group-to-flash mapping table to establish the mapping table that shows mapping information of the data that has been stored in the flash memory.

6. The data storage device as claimed in claim 1, wherein:
the microcontroller further writes a pre-defined serial number into the system information blocks;
when being powered up, the microcontroller scans the physical blocks of the flash memory and recognizes the system information blocks according to the pre-defined serial number; and
the microcontroller reads the grouping lists from the system information blocks and recognizes valid logically-grouped tables in the system information blocks based on the grouping lists and combines the valid logically-grouped tables to establish the mapping table that shows mapping information of the data that has been stored in the flash memory.

7. A flash memory control method, controlling a flash memory including a plurality of physical blocks with each physical block comprising a plurality of physical pages, comprising:
allocating the physical blocks to provide system information blocks,
recording mapping information of data that has been stored in the flash memory by a plurality of logically-grouped tables, wherein the logically-grouped tables combined together according to logical address form a mapping table;

storing the logically-grouped tables to physical pages of the system information blocks; and recording a grouping list in at least one pre-defined physical address of each system information block to list logical group numbers of the logically-grouped tables stored in the physical pages of the corresponding system information block, wherein:

in each system information block, more physical pages are used in storing the logically-grouped tables than are used in storing the grouping list;

valid logically-grouped tables are obtained according to the grouping list of each system information block without scanning through every page of all system information blocks;

recording time information in the system information blocks to be used in sorting the grouping lists in chronological order;

each grouping list is filled with a series of logical group numbers from old to new; and the grouping lists are combined and organized to form a long sequence of logical group numbers for obtaining the valid logically-grouped tables.

8. The flash memory control method as claimed in claim 7, wherein the logical address is a logical block address.

9. The flash memory control method as claimed in claim 7, wherein:

the logically-grouped table is searched by using the logical block address as an index.

10. The flash memory control method as claimed in claim 7, wherein the at least one pre-defined physical address indicates a final physical page of the system information block.

11. The flash memory control method as claimed in claim 7, further comprising:

reading the long sequence of logical group numbers from the end and adopting only logical group numbers that are first read from the long sequence of logical group numbers to form a group-to-flash mapping table that shows where valid logically-grouped tables are stored in the system information blocks.

12. The flash memory control method as claimed in claim 11, further comprising:

obtaining the valid logically-grouped tables of all logical group numbers from the system information blocks based on the group-to-flash mapping table to establish the mapping table that shows mapping information of the data that has been stored in the flash memory.

13. The flash memory control method as claimed in claim 7, further comprising:

writing a pre-defined serial number into the system information blocks;

when being powered up, scanning the physical blocks of the flash memory and recognizing the system information blocks according to the pre-defined serial number; and reading the grouping lists from the system information blocks and recognizing valid logically-grouped tables in the system information blocks based on the grouping lists and combining the valid logically-grouped tables to establish the mapping table that shows mapping information of the data that has been stored in the flash memory.

* * * * *